Aug. 31, 1948.  F. KRAKE  2,448,443
BOAT TRAILER AND THE LIKE
Filed Oct. 18, 1945  3 Sheets-Sheet 1
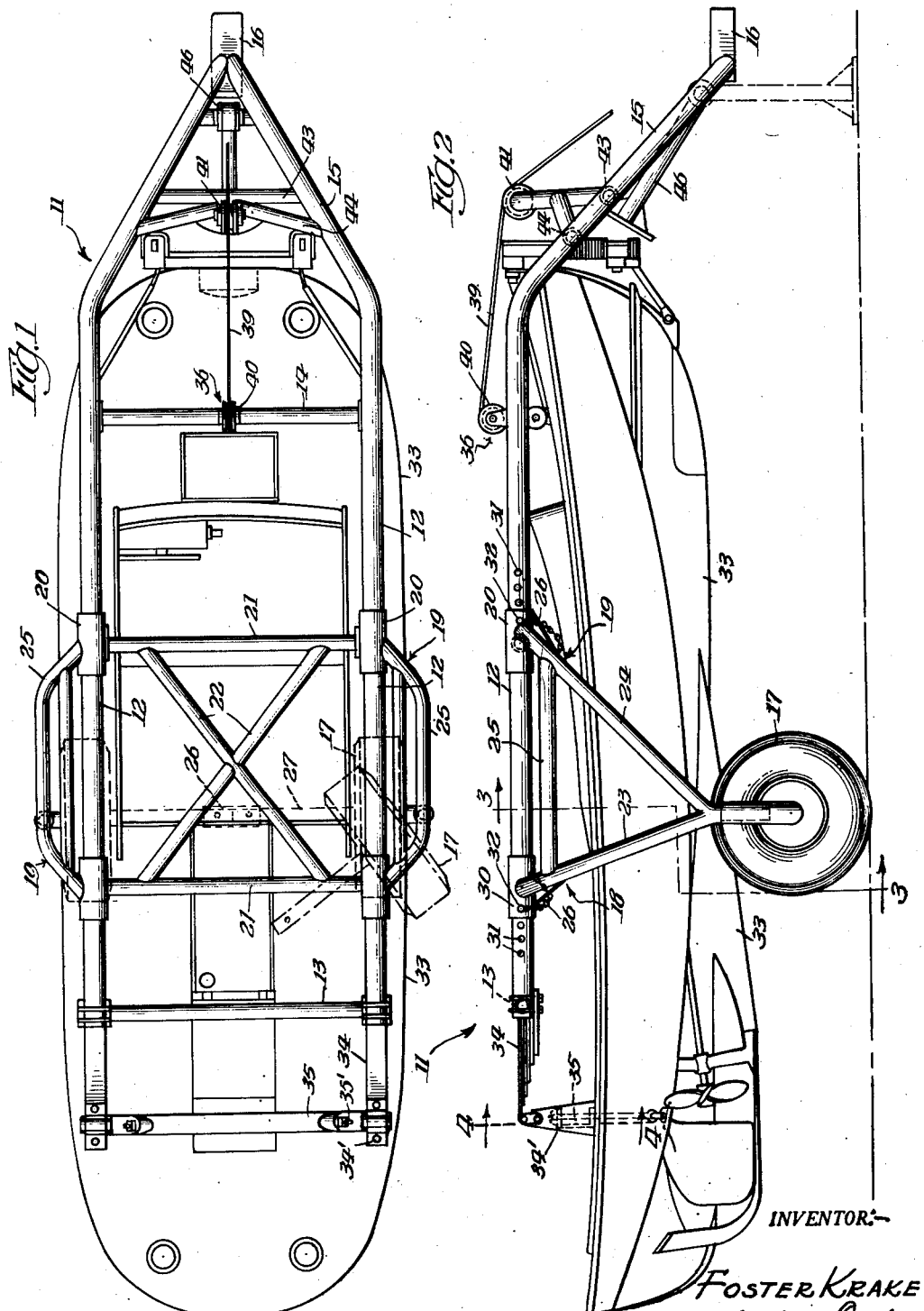
INVENTOR:-
Foster Krake
BY: Spencer, Marzall, Johnston & Cook.
attys.

Aug. 31, 1948.    F. KRAKE    2,448,443
BOAT TRAILER AND THE LIKE
Filed Oct. 18, 1945    3 Sheets-Sheet 2
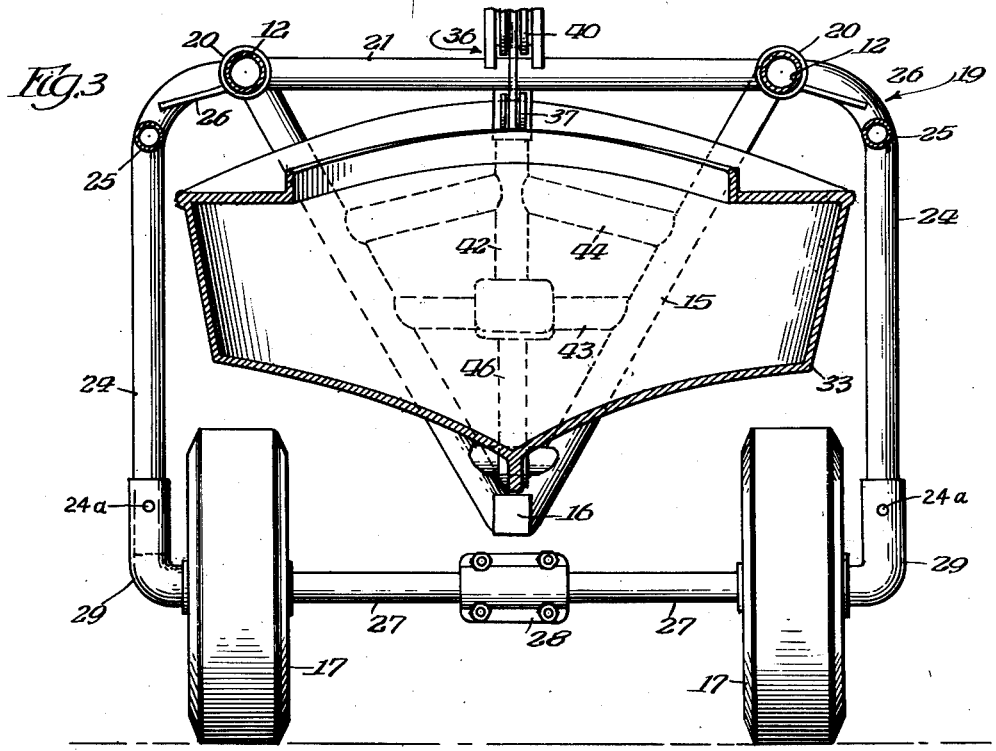
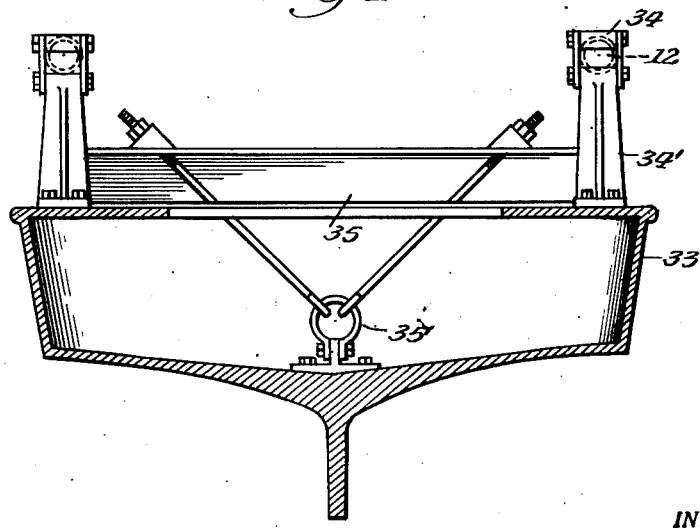
INVENTOR:—
FOSTER KRAKE
BY:— Spencer, Marzall, Johnston & Cook
Attys.

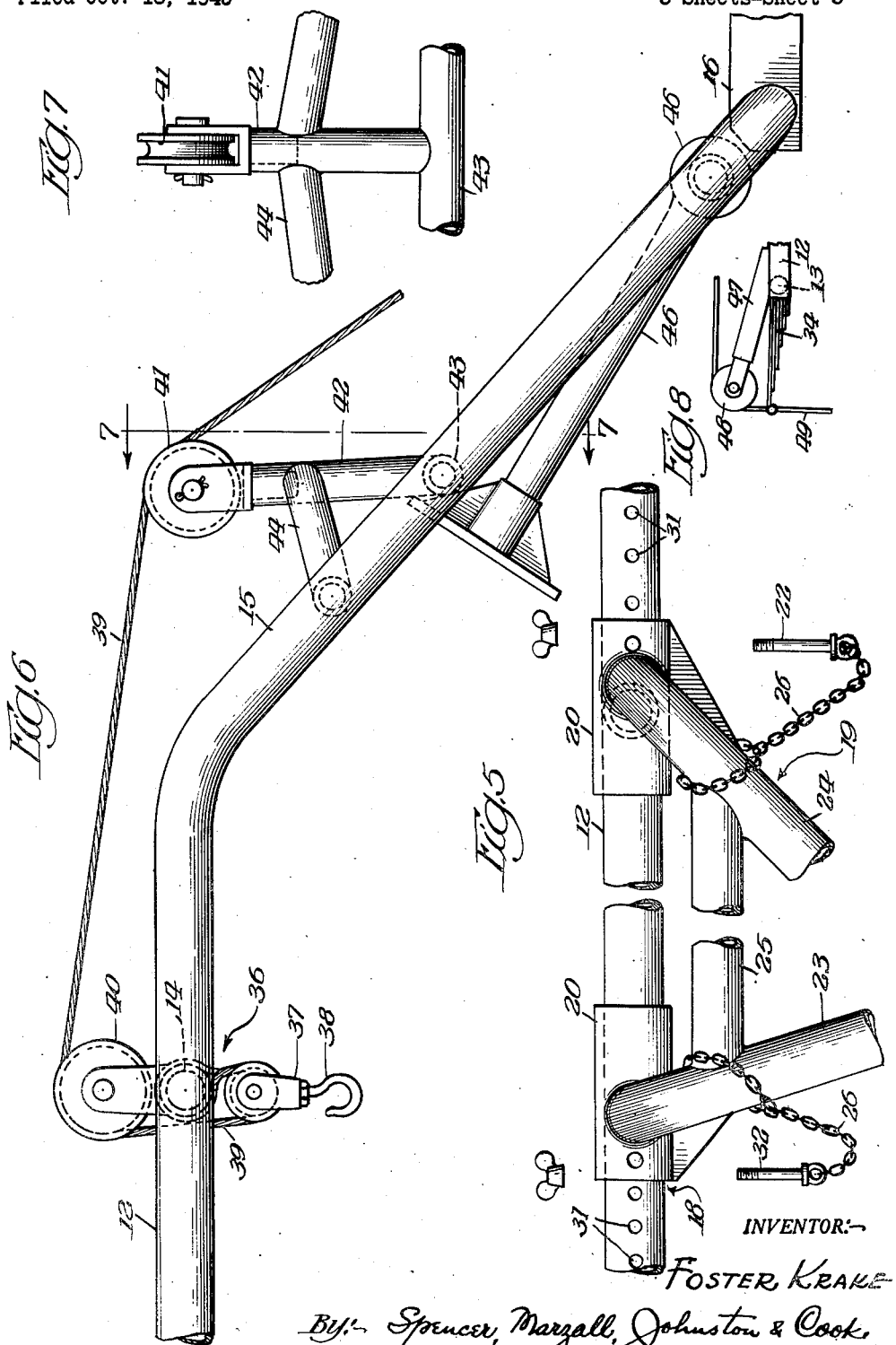

Patented Aug. 31, 1948

2,448,443

UNITED STATES PATENT OFFICE 2,448,443

BOAT TRAILER AND THE LIKE

Foster Krake, Coloma, Mich., assignor to Sporting Specialties Company, Coloma, Mich., a corporation of Michigan Application October 18, 1945, Serial No. 623,130

10 Claims. (Cl. 214—65)

The present invention relates in general to trailers and has more particular reference to a trailer device for the transportation of boats and other objects, the invention having specific application to a carrier adapted to be drawn overland by a suitable tractor, such as an automobile or other tractive means.

An important object of the invention is to provide a light, yet strong and rugged carrier device for the transportation of boats or other objects in suspended position on the trailer; a further object being to provide a carrier comprising a frame having supporting wheels adjustable longitudinally of the frame to allow for the positioning of the wheels in desired relationship with respect to the center of gravity of the object being carried when mounted in carrying position on the frame.

Another important object is to provide a wheeled trailer comprising axially aligned wheels mounted on and adjustable longitudinally of the frame; a further object being to provide a frame comprising longitudinally extending, preferably tubular frame members, and to mount the wheels on a wheel carrying sub-frame supported upon and longitudinally adjustable on said tubular frame members.

Another important object is to provide a carrier comprising a frame provided with spaced supporting wheels mounted intermediate the opposite ends of the frame whereby said carrier may straddle the object to be carried and tilted on said wheels to connect one end of the frame with said object; another object being to provide power multiplying mechanism, on said frame, for lifting and supporting remote portions of said object, to thereby suspend said object in carrying position on the frame.

Another important object is to utilize a pulley system in said frame, at or adjacent an end thereof, for hoisting an end of the object, to be carried, into carrying position with respect to the frame.

Another object is to provide a trailer for transporting boats and the like, which is easy to load and unload, which is adapted for adjustment to transport boats of varying size, as by adjusting the trailer wheels longitudinally on the trailer; a further object being to provide a trailer which has a low center of gravity, when loaded, so that it will hold the road, when in transit overland.

Among the other important objects and advantages of the invention is to provide a trailer comprising a wheeled frame formed substantially entirely of tubular frame members affording a lightweight, rigid, yet relatively inexpensive structure; another object being to provide such tubular frame with support means for suspending a boat or other object in carrying position in the frame, including resilient leaf spring suspension means, at one end of the frame, and power multiplying hoisting means at or near the other end of the frame.

Numerous other objects, advantages and inherent functions of the invention will become apparent as the same is more fully understood from the following description, which, taken in connection with the accompanying drawings, discloses a preferred embodiment of the invention.

Referring to the drawings:

Fig. 1 is a top plan view showing a trailer embodying the present invention with a boat suspended in carrying position on the trailer;

Fig. 2 is a side elevation view of the device shown in Fig. 1;

Figs. 3 and 4 are sectional views taken substantially along the lines 3—3 and 4—4 in Fig. 1;

Fig. 5 is an enlarged fragmentary view showing portions of the trailer;

Fig. 6 is a fragmentary view of a portion of the trailer;

Fig. 7 is a view taken substantially along the lines 7—7 in Fig. 6; and

Fig. 8 is an auxiliary structure which may be included in the carrier.

As shown in the drawings, the trailer may embody a main frame 11 comprising a pair of spaced apart longitudinally extending, preferably tubular members 12. At the rear end of the frame and also near its front end, the members 12 are connected together and maintained in spaced relationship by transverse, preferably tubular, bracing and spacing members 13 and 14 which may be secured to and between the members 12, in preferably integrated fashion, as by welding or otherwise fastening the members 13 and 14 rigidly to the spaced members 12. The longitudinally extending members 12 project forwardly of the forward bracing member 14 and are preferably bent inwardly and downwardly, as at 15, the terminal forward ends of the members 12 being welded or otherwise connected together and to a hitching member 16, by means of which the trailer frame may be detachably connected to a suitable tractor, for hauling the same.

The frame 11 may be supported upon a pair of wheels 17 which are preferably connected to the frame 12 in fashion allowing adjustment of the wheels longitudinally of the frame. To this end, the wheels 17 are preferably mounted on a wheel carrying sub-frame 18 which, in turn, is longitudinally adjustable on the frame 12. The frame 18 preferably comprises tubular frame members rigidly interconnected, as by welding, to provide spaced apart and downwardly extending wheel supporting legs providing preferably vertical wheel mounting portions 19 on opposite sides of the trailer.

The frame 18 may comprise a pair of sleeves 20 on each side of the frame, each pair of sleeves slidingly embracing one of the frame members 12. Each sleeve 20 on one frame member 12 may be connected with the corresponding sleeve 20 on the other member 12 by means of a preferably tubular transverse bracing and spacing member 21, the opposite ends of each member 21 being rigidly secured each to a sleeve 20, as by welding. The members 21 may be maintained in parallel spaced apart relationship, as by means of diagonally extending, preferably tubular bracing members 22 extending therebetween and secured to the members 21, as by welding.

Each of the dependent wheel carrying legs may comprise a preferably tubular member 23 having an end secured to one of the sleeves 20, on one side of the frame 18, the other end of said member 23 forming the mounting 19 for one of the wheels 17. The wheel carrying member 23 may be braced and rigidified on the frame 18 by a preferably tubular bracing member 24 secured, as by welding, at one end, to the other of said sleeves 20, the other end of the member 24 being welded or otherwise secured to the wheel carrying member 23 adjacent said wheel mounting 19. The sleeve connected ends of the leg forming members 23 and 24 may be braced and rigidified, as by a preferably tubular bracing member 25, having opposite ends welded or otherwise secured to said members 23 and 24 at or adjacent the sleeve connected ends thereof. Bracing and rigidifying webs or plates 26 also may be welded to the mounting sleeves 20 and the ends of the leg members 23 and 24 at and adjacent said sleeves.

Each of the wheels 17 may be mounted on its corresponding mounting portion 19, in any suitable or preferred fashion. Preferably, each wheel is journaled for rotation on an axle member 27, which may extend toward and in axial alignment with the axle member of the other wheel, and the abutting ends of the axle members 27 may be secured together, as by means of a suitable preferably detachable coupling 28. On the outwardly facing sides of the wheels 17, the axles 27 may be provided each with a journal member 29 for receiving the wheel mounting portion 19 of the corresponding wheel carrying member 23, the members 29 forming journals turnable on and with respect to said wheel mounting portions. The wheels and their axles may thus be mounted on the frame 18 for rotational movement about the vertical axes of the wheel mountings 19. By disconnecting the coupling 28, both wheels 17 may be turned on their wheel mountings 19 into position extending outwardly of the wheel carrying legs, on opposite sides of the trailer, and secured in such position in any suitable manner, such as by means of a fastening device such as a pin or bolt passing through an aperture 29a in the journal member 29, and a registering aperture in the member 24, to thereby leave the space between the wheel carrying legs entirely open and free of obstruction, whereby to allow a boat or other object to extend freely in such unobstructed space while being loaded on or unloaded from the trailer. After loading or unloading, the trailer may be conditioned for transit by returning the wheels to normal traveling position and by replacing the coupling 28 in order to hold the wheels in traveling position disposed inwardly of the legs, on opposite sides of the trailer.

The frame 18 may be adjusted longitudinally of the frame 11 by sliding the frame members 12 in the sleeves 20 and by locking the parts in adjusted position. Any suitable or preferred latching means may be provided for locking the frames 11 and 18 together in adjusted position. As shown, this locking may be accomplished by providing bolt holes 30 in the sleeves 20 and bolt holes 31 at spaced intervals in the members 12, the parts being locked together in adjusted position as by suitable bolts 32 adapted to be secured in the holes 30 and 31, when in alignment. If a trailer is to be used continuously for carrying a particular boat, the sleeves 20, after the sub-frame 18 has been adjusted, may be welded or otherwise permanently secured to the frame 11.

A boat 33 or other object to be carried may be suspended on the frame 11 by opening the wheels 17 outwardly and then by rolling the trailer into position with its outwardly opened wheels straddling the opposite sides of the boat, with the rear end of the trailer extending above the rear of the boat. In this connection it is noted that a boat usually will be supported in the trailer with its bow toward the front end of the trailer, although the boat could be carried stern foremost, in the trailer, if desired. Means may be provided for temporarily latching the wheels in outwardly opened position while the trailer is being rolled into position straddling the boat. Such latching means may comprise a pin placeable in holes formed diametrally in the journals 29 and the wheel mounts 19 to prevent the journals from turning on the mounts.

Suspension means, preferably in the form of leaf springs 34, may be mounted at the rear ends of the frame members 12. By elevating the forward end of the frame 11, the springs 34 may be correspondingly lowered into position for attachment to the boat 33 or other object to be suspended on the trailer.

To this end, the boat may be provided with a yoke 35 to facilitate attachment on the spring means 34. The yoke 35, as shown in Fig. 4, may take the form of a transverse beam, adapted to overlie the boat and formed with lugs 34' at its opposite ends for attachment, as by means of shackles, to the springs. The beam may be anchored on the boat by means of inclined tension rods 35' detachably secured, as by means of a U-bolt, to a perforated lug mounted on the keel of the boat.

After one end of the boat has thus been connected upon the springs 34, at one end of the frame, the other end of the frame may be lowered to thus pivot the frame about the wheel axles 27, thereby constituting the frame as a powerful lever for elevating the spring connected portions of the boat. The opposite end of the boat will then project beneath the forward end of the frame. In order to lift the forward portions of the boat into carrying position, the frame 11 may be provided with power multiplying hoisting mechanism 36, preferably comprising a pulley block 37 formed with a hook 38 for engagement with a suitable eye, or other attachment device, fastened to the boat. This pulley block 37 is supported in a bight in a hoisting rope 39, one end of which rope may be anchored on the frame 11, as by connecting it to the bracing member 14 of the frame. From its anchorage, the rope 39 may extend around the pulley block 37, thence around a guide 40 on the frame 11, thence over a guide pulley 41 carried by a suitable support 42 on the forward portions of the frame, the rope passing thence to suitable winding mechanism which may be, and preferably is, mounted on the tractor. Alternately, the winding mechanism may be mounted on the frame 12, preferably at its forward end. The winding mechanism may be of any suitable or preferred character and may comprise a winding drum provided with power multiplying means for the manual operation of the same, or the drum may, of course, be power driven.

The hoisting mechanism may serve alone to support the forward portions of the boat on the trailer, during transit, but additional support means may be, and preferably is, provided. To this end, a sling comprising rope or a fabric web may be applied under the forward portions of the boat and attached to the frame members 12, or the member 14, on opposite sides of the frame. The opposite ends of such sling may be provided with quick action fastening means for attaching the same on the frame, and the sling is preferably made adjustable as to its length to accommodate the sling to the girth of the object to be suspended. It is also desirable to apply a detachable sling at the rear end of the frame, at or near the frame member 13, as a protection against possible failure of the suspension springs 34 or the yoke 35 while the boat is in transit.

The pulley mounting 42 may comprise a rigid, braced tubular member mounted on a transverse frame member 43 and supported by bracing members 44; or the tubular member may be pivoted, at one end, on the transverse bracing member 43 between the inwardly inclined front end portions of the frame member 12, such pivoted member being swingable downwardly from an upstanding operative position to an inoperative position substantially in the plane of said inclined front portions of the member 12. To support such pivoted arm 42 in operative position, the bracing means 44 may be formed as a single tube extending between the members 12 to form a support rest for the member 42.

The hitching device 16, at the forward end of the frame 11, may be of any suitable or preferred form to enable the trailer to be secured to a cooperating coupling structure on the tractor. Trailer supporting means is preferably provided for supporting the forward end of the trailer when the same is disconnected from the tractor. Such supporting means may conveniently comprise a leg 46 pivoted on and between the forward ends of the frame members 12 at and immediately adjacent the hitching member 16. The pivoted leg may be disposed in extended position to support the front end of the frame at a suitable elevation to facilitate connection or disconnection of the hitching member 16 with the tractor. When not in use, the leg 46 may be swung on its pivot to inoperative position suspended between and beneath the inclined forward portions of the frame members 12, suitable fastening means being provided for supporting the leg in inoperative position on the frame.

If desired, means may be provided for hoisting the object to be carried into position for attachment to the springs 34. To this end, as shown more particularly in Fig. 8, the frame may be provided with a preferably centrally located member 47, projecting rearwardly of the cross member 13, between the suspension springs 34. The member 47 at its end may be fitted with a pulley 48 for carrying a flexible hoisting member 49, one end of which may be connected with a hook adapted to engage in a centrally located eye bracket on the bracket member 35'. The other end of the hoisting member 49 may be connected with suitable winding mechanism which may be the same mechanism used for winding the rope 39, suitable guide pulleys being provided wherever needed in the frame 11 for guiding the member 49 to the winding mechanism.

The pulley carrying member 47 may conveniently be secured at on end pivotally upon the mid portions of one of the frame members 21, and may extend thence rearwardly in position resting upon and supported by the cross member 13; and, if necessary, the member 47 may be formed as an extensible member adjustable as to length to accommodate longitudinal adjustment of the auxiliary frame 19, so as to support the pulley 48 in position substantially vertically above the bracket 35.

It will be seen from the foregoing that the invention provides a strong and rigid carrier particularly for boats and other elongated objects of substantial mass, the carrier being adapted to be drawn overland by suitable tractor means. The carrier is provided with means facilitating the attachment of the object to be carried, such means including carrier supporting wheels longitudinally adjustable on the carrier, whereby the same may be utilized as a powerful lever fulcrumed on said wheels to lift an attached end of the boat or other object, to be carried, into carrying position. The carrier is also provided with readily operable power multiplying hoisting means for lifting the other end of the object, to be carried, into carrying position. The novel arrangement whereby the wheels are mounted on the carrier in position allowing the same to be opened outwardly to enable a transportable object to be loaded, allows the carrier to have minimum overall carrying width compatible with the maximum width of the object to be carried.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A trailer embodying a suspension frame for a transportable object to be carried, towing means at an end of said frame, a dependent wheel carrying leg at the side of said frame, and a wheel supporting member on said leg and carrying a wheel in position alongside of said leg, said wheel supporting member being turnable on said leg to dispose said wheel selectively in normal and in shifted positions, on opposite sides of the leg, respectively during overland transportation of the carrier and during the loading or unloading of the transportable object, and means to releasably secure said wheel supporting member against turning movement on said leg when in either normal or shifted position.

2. A trailer embodying a suspension frame for a transportable object to be carried, towing means at an end of said frame, transversely aligned dependent wheel carrying legs on opposite sides of said frame, a wheel supporting member turnably mounted on each leg and carrying an outstanding wheel axle whereby said axles may be disposed in alignment and interconnected beneath the frame and also may be disconnected and turned on said legs into position extending outwardly of said frame, and a wheel on each axle adjacent the leg on which it is mounted.

3. A carrier comprising a suspension frame for a transportable object to be carried, towing means at an end of said frame, a dependent wheel carrying leg at the side of said frame, and a wheel supporting member on said leg and carrying a wheel in position alongside of said leg, said wheel supporting member being turnable on said leg to dispose said wheel selectively in normal and in shifted positions, on opposite sides of the leg, respectively during overland transportation of the carrier and during the loading or unloading of the transportable object, said wheel carrying leg being longitudinally adjustable on said frame toward and away from said towing means.

4. A carrier comprising a suspension frame for a transportable object to be carried, towing means at one end of said frame, transversely aligned dependent wheel carrying legs on opposite sides of said frame, intermediate the ends thereof, a wheel supporting member turnable on and about each leg and carrying an outstanding wheel axle, a wheel on each axle adjacent the leg on which it is mounted whereby the wheels may be disposed in axial alignment either inwardly or outwardly of said legs, said carrier being tiltable on said wheels to enable an object, to be carried, to be attached to said carrier on one side of said wheels, and power multiplying hoisting means on said carrier on the other side of said wheels for lifting the object, to be carried, into carrying position on the frame.

5. A trailer embodying a wheel supported carriage, said carriage embodying spaced side members and laterally spaced bearings adjacent the top thereof, a load-carrying frame having spaced side members respectively and freely slidable in said bearings, means for maintaining said frame and bearings in predetermined relative adjusted positions, the forward ends of said frame members converging toward each other and inclining downwardly, means for suspending from said load-carrying frame, intermediate the ends thereof, an object to be carried, and means mounting the wheels upon said carriage for rotative adjustment about upright pivots.

6. A trailer embodying a wheel supported carriage, laterally spaced bearings adjacent the top thereof, a load-carrying frame embodying laterally spaced frame members seated in the respective said bearings, the forward ends of said frame members being connected together, means for connecting to said frame, an object to be carried, said carriage and said load-carrying frame being relatively adjustable, one with respect to the other and in directions lengthwise of the carrying frame, and means for securing said frame and carriage in any position to which they have been relatively adjusted, the major portions of said carriage and load-carrying frame being formed of tubular members secured together and braced to impart rigidity thereto.

7. A trailer embodying a wheel supported carriage, said carriage comprising tubular members forming spaced wheel-carrying leg structures each having a pair of sleevelike bearings in spaced apart coaxial alinement, and transverse tubular members interconnecting said spaced wheel-carrying structures and serving to brace and space the same apart, and a load-carrying frame having spaced tubular side members respectively and freely slidable each in a pair of said sleevelike bearings, means for securing said frame in predetermined longitudinally adjusted position with respect to said bearings, means bracingly and spacingly interconnecting the said spaced side members of the load-carrying frame, and means for suspending an object to be carried on said load-carrying frame.

8. A trailer embodying a wheel supported carriage, said carriage comprising tubular members forming a wheel-carrying leg structure having a pair of sleevelike bearings in spaced apart coaxial alinement, a load-carrying frame having an elongated tubular member extending in and freely slidable within said sleevelike bearings, means for securing said elongated tubular member in longitudinally adjusted position with respect to said bearings, means for suspending an object to be carried on said load-carrying frame at suspension points on opposite sides of said wheel supported carriage, including leaf spring means at one end of said frame, and means for connecting the opposite end of said frame with tractor means.

9. A trailer embodying a wheel supported carriage, said carriage comprising tubular members forming a wheel-carrying leg structure having a pair of sleevelike bearings in spaced apart coaxial alinement, a load-carrying frame having an elongated tubular member extending in and freely slidable within said sleevelike bearings, means for securing said elongated tubular member in longitudinally adjusted position with respect to said bearings, means for suspending an object to be carried on said load-carrying frame at suspension points on opposite sides of said wheel supported carriage, including leaf spring means at one end of said frame, and power multiplying hoisting means at the other end of said frame.

10. A trailer embodying a wheel supported carriage, said carriage comprising tubular members forming a wheel-carrying leg structure having a pair of sleevelike bearings in spaced apart coaxial alinement, a load-carrying frame having an elongated tubular member extending in and freely slidable within said sleevelike bearings, means for securing said elongated tubular member in longitudinally adjusted position with respect to said bearings, means for suspending an object to be carried on said load-carrying frame at suspension points on opposite sides of said wheel supported carriage, including leaf spring means at one end of said frame, and a foldable supporting leg pivotally connected to the opposite end of said frame for movement into and out of frame supporting position.

FOSTER KRAKE.

REFERENCES CITED

The following references are of record in the file of this patent:

UNITED STATES PATENTS

| Number | Name | Date |
| --- | --- | --- |
| 1,180,327 | Simpson | Apr. 25, 1916 |
| 1,366,771 | Devencenzi | Jan. 25, 1921 |
| 1,531,180 | Erickson | Mar. 24, 1925 |
| 2,218,510 | Albertson et al. | Oct. 22, 1940 |
| 2,260,676 | Lafaye | Oct. 28, 1941 |
| 2,296,611 | Greene | Sept. 22, 1942 |
| 2,375,754 | Ballinger | May 15, 1945 |
| 2,388,870 | Sackett | Nov. 13, 1945 |

FOREIGN PATENTS

| Number | Country | Date |
| --- | --- | --- |
| 470,114 | Great Britain | Aug. 10, 1937 |
| 758,279 | France | Oct. 23, 1933 |